Feb. 9, 1937. C. D. PETERSON ET AL 2,070,140
CLUTCH FOR TRANSMISSION GEARS
Filed Jan. 17, 1934 2 Sheets-Sheet 1
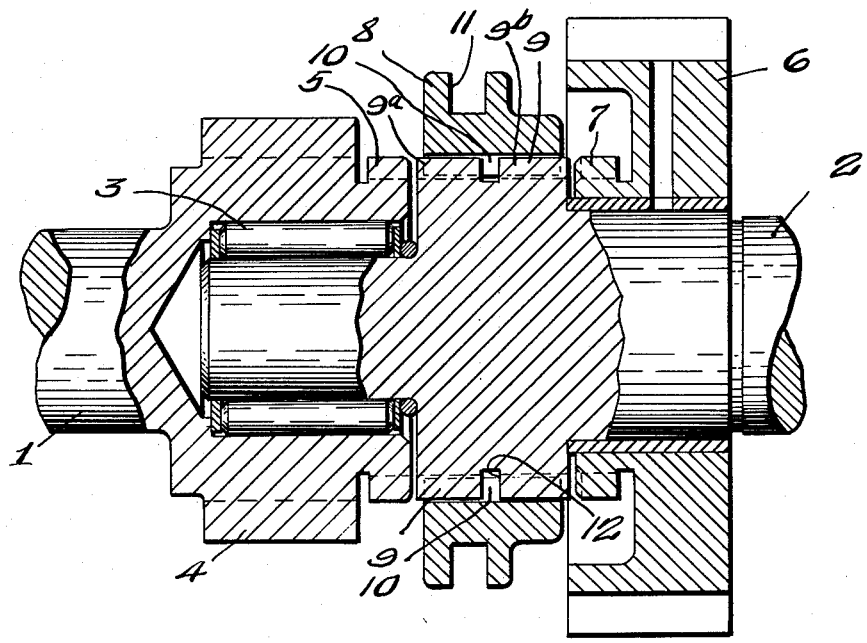
Fig-1-
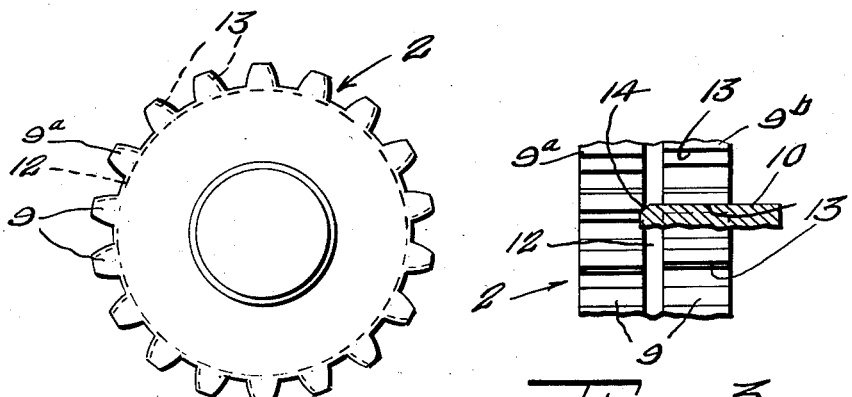
Fig-2-    Fig-3-
INVENTORS.
Carl D. Peterson and Albert H. Weimel
BY Bodell + Thompson
ATTORNEYS.

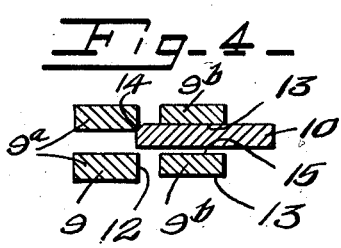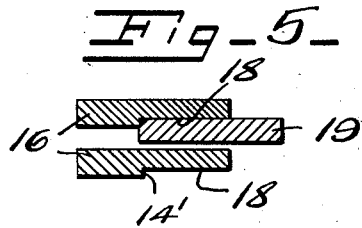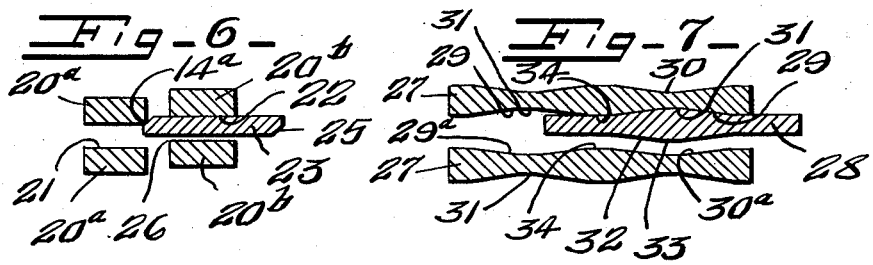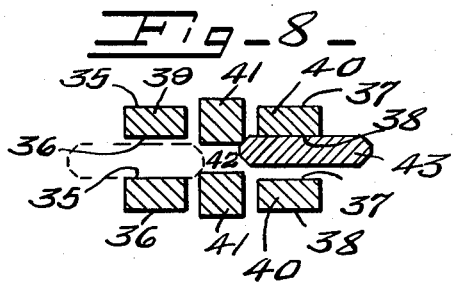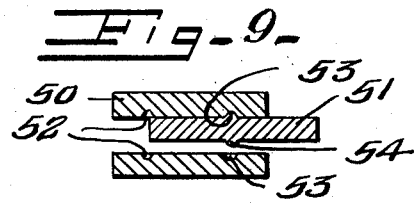

Patented Feb. 9, 1937

2,070,140

UNITED STATES PATENT OFFICE 2,070,140

CLUTCH FOR TRANSMISSION GEARS

Carl D. Peterson and Albert H. Deimel, Toledo, Ohio, assignors to Spicer Manufacturing Corporation, a corporation of Virginia Application January 17, 1934, Serial No. 706,988

9 Claims. (Cl. 192—114)

This invention relates to toothed or jaw clutches of the type used in motor vehicles to effect direct drive between the engine and the propeller shaft of the vehicle, or an indirect drive through gearing to rotate the propeller shaft at a greater or less speed than the engine shaft, although it is applicable to toothed clutches used in other situations, and has for its object a means for locking the clutch in engaged position and to prevent so-called "walking out" of the clutch when torque is being applied, and at the same time permitting, without obstruction, the shifting of the clutch out of engaged position when desired.

It further has for its object, a clutch having self-contained means by which it is automatically locked by torque applied thereto when in either of its engaged positions, that is, when in position to effect direct drive, or indirect drive, or both, or when it is in only one of such engaged positions as for instance, indirect drive, and also to lock the clutch in either of its engaged positions, or in one only when the torque is being applied by the driven shaft, that is, when the vehicle under its momentum, as when coasting, and the propeller shaft tends to drive the engine. It will be understood that the tendency of the clutch to "walk out" is greater in indirect drive and particularly, when coasting.

It further has for its object, a construction of the splines of the shaft on which the shiftable clutch member or collar is slidably mounted, whereby the automatic locking is effected without additional parts other than the splines, or a locking means self-contained with the splines.

The invention consists in the novel features and in the combinations and constructions hereinafter set forth and claimed.

In describing this invention, reference is had to the accompanying drawings in which like characters designate corresponding parts in all the views.

Figure 1 is a fragmentary elevation, partly in section, of a clutch embodying our invention, the contiguous portions of the driving shaft and transmission gearing being shown.

Figure 2 is an end view illustrating the spline construction by means of which the automatic locking is effected.

Figure 3 is a fragmentary edge view of the spline portion of the transmission shaft, one of the coacting splines of the shiftable clutch member, or collar, being shown in section.

Figures 4 to 9 inclusive are diagrammatic views of splines on the transmission shaft, and the clutch collar showing the coaction thereof for different locking effects, Figure 4 illustrating the locking in indirect drive only when torque is being applied by the drive shaft to the transmission shaft indirectly through gearing, reduction or otherwise; Figure 5 being similar to Figure 4, and illustrating locking in indirect drive position but with the splines on the transmission shaft continuous, or not cut out by an annular groove; Figure 6 illustrating a construction in which the clutch is locked in either direct or indirect drive positions when torque is being applied; Figure 7 illustrating still another embodiment or modification in which the splines on the shaft are continuous and the splines of both the shaft and the clutch collar provided with means to interlock to hold the clutch collar in direct and indirect drive position when torque is being applied by the drive shaft to the transmission shaft and when being applied from the transmission shaft to the drive shaft, as when the vehicle is coasting; Figure 8 illustrating a spline construction where the clutch member is locked, as in Figure 7, against walking out under all conditions, that is, when driving in either direct or indirect drive and when coasting in either direct or indirect drive; and Figure 9 illustrating a spline construction wherein the recesses in the splines of the shaft are relatively small and receive complemental bosses or projections on the internal splines of the clutch collar.

This clutch construction comprises, generally, inner and outer members, one of which, usually the outer member, is slidable axially relatively to the other, said members having slidably interlocking projections, or tongues and grooves, as interfitting splines, so that the two members rotate as a unit, the splines being provided with means for interlocking under the influence of the torque applied from one clutch member to the other when the shiftable clutch member is in shifted position and to release when the torque ceases to be applied, and hence prevent unintentional shifting of the shiftable clutch member. The means for interlocking for preventing unintentional shifting out of engaged position while torque is being applied includes recesses provided in the splines of one of the members, preferably, in the external splines of the inner member, which recesses are located to receive the end portions of the splines of the other or outer member when in shifted position, so that the end portions of the outer splines abut against the end walls of the recesses which form shoulders preventing axial shifting of the outer member from shifted position when torque is being applied. When torque is not being applied, obviously, the splines of the outer member move out of the recesses. However, in order to facilitate intentional shifting of the latter member and the disengagement of the splines out of the recesses, when the torque is not applied, the ends of the splines of the outer member and the end walls of the recesses are shaped to engage incline-plane fashion and preferably, the ends of the splines of the outer shiftable member are bevelled.

We have illustrated various embodiments of our invention and as adapted to a double clutch, that is, a clutch which shifts in opposite directions from neutral into two engaged positions for direct drive and indirect drive, and we have shown locking means which locks the clutch against disengagement when torque is being applied from the inner member of the clutch to the outer member when in indirect drive position, and also for preventing disengagement when in either direct or indirect drive position, the clutch being locked against disengagement when in indirect drive, against walking out when torque is being applied reversely from the driven shaft to the driving shaft to the clutch. We have also illustrated constructions whereby the double clutch is locked in engaged position under all conditions, when torque is being applied, that is, the clutch is locked against disengagement when in direct or indirect drive and torque is being applied by the outer member of the clutch to the inner, and also when the clutch is in either direct or indirect drive and the torque is being applied reversely, as when a motor vehicle is coasting, from the transmission shaft to the driving shaft through the clutch.

As ordinarily, the clutch member tends to "walk out" of engagement, when the vehicle is coasting and in indirect drive, it is, in many cases, necessary to provide against "walking out" only when the clutch is in indirect drive position. However, in other situations, it is desirable to lock the clutch member in either direct drive or indirect drive position, when torque is being applied by the engine, and when torque is being applied by the propeller shaft.

This invention comprises coacting means provided on the inner and outer clutch members, operable by the torque to prevent the clutch member from walking out of engaged position, the locking means being self-contained with the clutch members, and preferably built into the spline construction thereof so as to lock automatically when torque is being applied from one member to the other.

We have here shown our invention as applied to what is sometimes called the high speed clutch of a transmission gearing, which is a double clutch, operable in one direction from neutral to connect the driving and transmission shaft of the gearing directly together and in the opposite direction from neutral to connect the transmission shaft with the driving shaft through a train of gears, some of which are mounted on the usual countershaft.

1 designates the drive shaft and 2 the transmission shaft, this usually having a pilot bearing at 3 in the end of the drive shaft 1 or in a gear 4 formed integral with the shaft 1. The shaft 1 or the gear 4 is provided with a peripheral toothed clutch face 5.

6 is a gear rotatably mounted on the transmission shaft 2 and formed with a toothed clutch face 7 on its side opposed to the clutch face 5. The gear 6 is connected through gears on the countershaft, not shown, to the gear 4 of the drive shaft 1.

8 is an axially shiftable outer clutch member or collar interposed between the clutch faces 5 and 7 and rotatable with the shaft 2. The shaft 2 is provided with a head which constitutes the inner member of the clutch. The head is formed with lengthwise splines 9, and the clutch member or collar 8 is provided with internal splines 10, slidably interlocking with the splines 9. Like end portions of the splines 10 interlock with the teeth 5 when the clutch member is shifted in one direction, in order to connect the shafts 1, 2 together in direct drive relation, and the other end portions of the splines 10 interlock with the clutch teeth 7 of the gear 6 when the clutch member or collar 8 is moved in the other direction from neutral, to connect the shafts 1, 2 together in an indirect drive relation through the train of gears. The clutch 8 is shifted in any suitable manner by the usual shifting lever, which, through suitable connections, operates a fork working in the groove 11 of the clutch member or collar 8.

In the spline construction of the shaft 2, shown in Figures 1 and 3, the splines 9 are separated into end portions 9a and 9b, by a circumferential groove 12 while the internal splines 10 of the clutch member or collar 8 are continuous. When the clutch collar 8 is shifted in one direction, as to the left, from neutral, like end portions of the splines interlock with the clutch teeth 5 and the other end portions with the spline sections 9a of the splines 9. When the clutch collar 8 is shifted in the other direction from neutral, that is, to the right, the right hand end portions of the splines 10 interlock with the clutch teeth 7 of the gear 6 and the other end portions interlock with the spline sections 9b of the shaft 2.

In Figures 1, 3 and 4, the spline construction is intended to lock the clutch collar from walking out when coasting in indirect drive. Therefore, the spline sections 9b are recessed or cut back at 13 on one face thereof, so that when the propeller shaft of the vehicle is driving the shaft 2, as when coasting, the shaft 2 is driving the shaft 1 through the clutch collar 8, the bottoms of the recesses 13 engage the splines 10 and the splines 10 are slightly out of line with the spaces between the spline sections 9a, so that the inner corners 14 of the splines 10 now thrust against shoulders provided by the inner corners of the spline sections 9a, and hence, the splines 10 are held from shifting back to neutral, as long as torque is being applied to the collar 8 from the shaft 2. When torque ceases to be applied under this condition, when the vehicle ceases to coast and the shaft 1 again applies driving torque to the shaft 2 through the splines 10, the splines 10 will move out of the recesses 13 against the unrecessed or uncut back faces 15 of the spline sections 9b so that now the splines 10 can be shifted, when the collar 8 is shifted by the gear shifting lever. In order to avoid the possibility of the splines 10 hooking on the corners of the spline sections 9a and also in order to make absolutely positive, the clutch shifting operation, when clutch shifting is intended, either shoulders at the inner corners of the splines 9a or the inner corners of the splines 10 or both are bevelled, and as here shown, the splines 10 are bevelled at their inner corners.

In Figure 5, the splines 16, corresponding to the splines 9, are shown as unprovided with the circumferential groove 12, and the continuous splines 16 are recessed at 18 to receive the inner end portions of the splines 19, corresponding to the splines 10, and provide abutting shoulders 14', corresponding to the shoulders 14 (Figure 4), when the clutch collar is shifted into indirect drive relation or into clutching engagement with the teeth 6. In this construction (Figure 5) the clutch collar 8 is locked against walking out when in indirect drive position and when the vehicle is coasting.

In Figure 6, the spline sections 20a and 20b, corresponding to the spline sections 9a and 9b (Figures 3 and 4), are slightly out of line, providing recesses at 21 and 22 and shoulders 14a and the internal splines 23 of the clutch collar, corresponding to the splines 10 are of a narrower width than the spaces between the splines 20a or 20b, or are the width of these spaces less the depth of the recesses 21 or 22. When the clutch collar, provided with the splines 23, is shifted to the right from neutral into indirect drive position, the clutch collar is locked against walking out when in indirect drive position, and when the shaft 2 is driving, as when coasting, corners of the splines 23 engage the inner corners of the spline sections 20a at 14a, as shown in Figure 6. When the clutch collar 8, provided with the splines 23, is shifted into direct drive position, the inner corners 25 of the splines 23 coact with the inner corners at 26 of the spline sections 20b, and prevent unintentional shifting under normal conditions, when the drive is being transmitted from the clutch collar 8 to the shaft 2, through the splines 23.

In Figure 7, 27 designates the splines on the shaft 2 and 28 the internal splines on the clutch member 8. In Figure 7, provision is made to lock the clutch from unintentional shifting or walking out under all conditions, that is, when the clutch is in direct drive position and in indirect drive position, and when in either of these positions, when the torque is being applied to the shaft 2 through the clutch collar or when the torque is being applied by the shaft 2 to the clutch collar, as when coasting. In this construction, the splines 27 are formed with recesses 29 and 30 provided with inclined or cam-shaped side walls and preferably with flat bottoms 31; and the internal splines 28 of the clutch collar are provided with a thickened intermediate portion 32 complemental to the recesses 29 and 30 and having substantially flat sides 33 for sliding along the side walls 34 of the splines 27 between the recesses, as when the clutch is passing from neutral position in either direction. Obviously, in this construction, when the clutch collar is shifted to the left into direct drive relation, the widened portion 32 thereof will interlock with the recess 29a when the torque is being applied from the clutch collar to the shaft 2 and thus lock the collar from walking out and the thickened portion 32 will interlock with the recess 29 when the torque is being applied by the shaft 2 to the clutch collar, as when coasting. Also, when the clutch is in indirect drive position, the thickened portions 32 of the splines 28 will interlock with the recesses 30a when the clutch collar is driving and with the recesses 30 when the transmission shaft 2 is driving the clutch collar 8, as when coasting.

In Figure 8, is shown a construction locking under all conditions, as in Figure 7, wherein the splines on the shaft 2 are formed with recesses 35, 36, 37 and 38, on opposite sides thereof, and in this construction, the splines are formed with alined sections 39, 40 with a large section 41 between their opposing ends or a section of greater width than the sections 39 and 40 and extending equally on opposite sides of said section with the space 42 between them for guiding splines 43 of the clutch collar into and out of neutral, thus providing the projections or spline sections 39, 40, 41 on one member, as the shaft 2, interfitting with projections, as 43, on the other or outer member 8, some of the projections on one member or the shaft, as the spline sections 39, 40, being located to provide spaces wider than the projections 43 on the other or outer member, thereby providing shoulders, as on the section 41, against which abut the ends of the projections 43, when torque is being applied, and also providing shoulder 14c. Obviously, when the clutch collar is shifted in one direction, as to the right, its internal splines 43 will take the position shown in Figure 8 in which they are located in the recesses 38, when the transmission shaft is applying the torque, as when coasting, and will take a position in the recesses 37 when the clutch collar is applying the torque when in direct drive. and the clutch will be held engaged by reason of the inner bevelled corners of the splines 43 engaging one or the other of the corners of the wider spline sections 41, which corners constitute abutting shoulders 14c.

In Figure 9, 50 designates the external splines of the transmission shaft 2, and 51 the internal splines of the clutch collar. In this figure, the splines 50 are shown as provided with a set of recesses 52 on opposite sides of one end portion and a similar set of recesses or depression 53 on the other end portion; and the splines 51, as provided with complemental bosses or projections 54 on opposite sides thereof. When the clutch collar is shifted in one direction, as to the right in indirect drive position, the bosses 54 on one side of the splines 51, enter the recesses 53 of the splines 50 and lock the clutch collar from walking out when in indirect drive position when torque is being applied, as when coasting, from the transmission shaft to the clutch collar. When the clutch collar is driving normally in indirect drive position, the projections 54 on opposite sides of the splines 51 take into the depressions 53 of the splines on the shaft 2. The same operation takes place when the clutch collar 8 is shifted into direct drive position, except that the bosses 54 coact with the recesses 52.

In any form of our invention, the clutch and the shaft have coacting slidably interlocking means, as splines for causing the clutch member and the shaft member to rotate together, as a unit, and the slidable interlocking means include additional means self-contained therewith and operable by the torque applied by one member to the other to lock the clutch member from walking out of engaged position when the torque is being applied and unlocking when the torque is discontinued. When the clutch member is locked in either direct or indirect drive position, the throwing out of the engine clutch relieves the parts of torque, so that the shifting operation can be permitted and the bevelling of one or the other or both of the abutting shoulders or corners which serve to lock the clutch in engaged position against walking out facilitates the unintentional shifting of the clutch collar by the hand shifting lever.

By our invention, a lock, if desirable, can be provided at an unappreciable cost and without adding additional parts.

What we claim is:

1. In a clutch construction, the combination of inner and outer clutch members, one of which is slidable axially relatively to the other, said members having slidably interlocking tongues and grooves, whereby the members rotate as a unit, the tongues of one of said members being provided with recesses in their side faces for receiving the end portions of the tongues of the other member, when the shiftable member is in shifted position, and thereby hold the shiftable member from shifting movement out of engaged position when torque is being applied.

2. In a clutch construction, the combination of inner and outer members, one of which is shiftable axially relatively to the other, said members having slidably interlocking splines, whereby the clutch members rotate as a unit, the splines of one of said members being provided with recesses in the side faces thereof and located to receive the splines of the other member when in shifted position and when torque is being applied from one member to the other, said recesses providing abutting shoulders on the splines for preventing axial shifting of the shiftable member out of shifted position, when torque is being applied.

3. In a clutch construction, the combination of inner and outer members, one of which is slidable axially relatively to the other, said members having respectively, external and internal slidably interlocking projections, the projections of one member being formed to provide spaces between end portions thereof wider than the projections of the other member for receiving the end portions of the projections of the other member, when the shiftable member is in shifted position and torque is being applied from one member to the other, the wider spaces between the end portions of the projections of one member providing shoulders for abutting against the ends of the projections of the other member when in shifted position, and thereby preventing shifting of the shiftable member out of shifted position when torque is being applied.

4. In a clutch construction, the combination of inner and outer members, one of which is slidable axially relatively to the other, said members having respectively, external and internal slidably interlocking projections, the projections of one member being formed to provide spaces between end portions thereof wider than the projections of the other member for receiving the end portions of the projections of the other member, when the shiftable member is in shifted position and torque is being applied from one member to the other, the wider spaces between the end portions of the projections of one member providing shoulders for abutting against the ends of the projections of the other member when in shifted position, and thereby preventing shifting of the shiftable member out of shifted position when torque is being applied, said shoulders being shaped to engage incline-plane fashion.

5. In a clutch construction, the combination of inner and outer members, the outer member being shiftable axially relatively to the inner, said members having slidably interlocking splines whereby the members rotate as a unit, the splines of the inner member having recesses in their side faces located to receive the end portions of the splines of the outer member when in shifted position and provide abutting shoulders against which the ends of the splines of the outer member abut when the outer member is in shifted position and torque is being applied from one member to the other.

6. In a clutch construction, the combination of inner and outer members, the outer member being shiftable axially relatively to the inner, said members having slidably interlocking splines whereby the members rotate as a unit, the splines of the inner member having recesses in their side faces located to receive the end portions of the splines of the outer member when in shifted position and provide abutting shoulders against which the ends of the splines of the outer member abut when the outer member is in shifted position and torque is being applied from one member to the other, said shoulders and the ends of the splines having incline-plane engagement.

7. In a clutch construction, the combination of inner and outer members, the outer member being shiftable axially relatively to the inner and said members having slidably interlocking projections whereby the two members rotate as a unit, the projections of the inner member being formed to provide spaces between end portions thereof wider than the projections of the outer member providing shoulders for receiving the end portions of the projections of the outer member when the outer member is in shifted position and torque is being applied from one member to the other.

8. In a clutch construction, the combination of inner and outer members, one of which is slidable axially in opposite directions from neutral into and out of two engaged positions, said members having slidably interlocking tongues and grooves whereby the members rotate as a unit, the tongues of one of the members being provided with recesses in the side faces thereof for receiving the end portions of the tongues of the shiftable member when in shifted position and torque is being applied from one member to the other and thereby locking the shifted member from shifting while torque is being applied.

9. The combination of a shaft member and a toothed clutch including a member slidable axially of the shaft member into and out of engaged position to connect the shaft member in a transmission line and to disconnect the same out of said line, the shaft member being provided with external splines and the clutch member with internal splines interfitting therewith, the splines of the shaft being formed with recesses in the sides thereof for receiving the splines of the clutch member when the latter is in engaged position, thereby providing shoulders at like ends of the recesses for abutting against the inner ends of the splines of the clutch member when in engaged position and torque is applied to one of said members by the other, thereby locking the shiftable clutch member from working out of engaged position while torque is being applied.

CARL D. PETERSON.
ALBERT H. DEIMEL.